US00RE42124E

(19) United States
(12) Reissued Patent
Riza

(10) Patent Number: US RE42,124 E
(45) Date of Reissued Patent: Feb. 8, 2011

(54) FAULT-TOLERANT FIBER-OPTICAL BEAM CONTROL MODULES

(76) Inventor: Nabeel Agha Riza, 1862 Royal Majesty Ct., Oviedo, FL (US) 32765

(21) Appl. No.: 10/422,341

(22) Filed: Apr. 24, 2003

Related U.S. Patent Documents

Reissue of:
(64) Patent No.: 6,222,954
Issued: Apr. 24, 2001
Appl. No.: 09/397,822
Filed: Sep. 17, 1999

(51) Int. Cl.
*G02B 6/26* (2006.01)

(52) U.S. Cl. ..... 385/18; 385/140
(58) Field of Classification Search ..... 385/16–23, 385/147; 250/339.05, 341.1, 342.2, 350, 250/351, 342.1; 355/27; 358/3.14; 216/24; 283/91
See application file for complete search history.

(56) References Cited

U.S. PATENT DOCUMENTS

| | | | |
|---|---|---|---|
| 4,790,566 | A | 12/1988 | Boissier et al. |
| 5,208,880 | A | 5/1993 | Riza et al. |
| 5,312,513 | A | 5/1994 | Florence et al. |
| 5,745,260 | A | 4/1998 | Blazey |
| 5,822,222 | A | 10/1998 | Kaplinsky et al. |
| 5,870,173 | A | 2/1999 | Oberhardt et al. |
| 5,923,036 | A | 7/1999 | Tague et al. |

FOREIGN PATENT DOCUMENTS

WO WO95920811 * 8/1995

OTHER PUBLICATIONS

V.Aksyuk, B. Barber, C.R. Giles, R. Ruel, L. Stulz and D. Bishop; Low Insertion loss packaged and fibre connectorised MEMS reflective optical switch; Electronics Letters, Jul. 9, 1998, vol. 34, No. 14, p. 1413–1414.

B.Barber, C.R. Giles, V. Askyuk, R. Ruel, L. Stulz, and D. Bishop; A Fiber Connectorized MEMS Variable Optical Attenuator; IEEE Photonics Technology Letters, vol. 10, No. 9, Sep. 1998, pp. 1262–1264.

Mino F. Dautartas, Albert M. Benzoni, Yang C. Chen, Greg E. Blonder, Bertrand H. Johnson, Carl R. Paola, E. Rice, and Y–H. Wong; A Silicon–Based Moving–Mirror Optical Switch, Journal Of Lightwave Technology, vol. 10, No. 8, Aug. 1992, pp. 1078–1085.

(Continued)

*Primary Examiner*—Hemang Sanghavi
(74) *Attorney, Agent, or Firm*—McDonnell Boehnen Hulbert & Berghoff LLP

(57) ABSTRACT

Fiber-optic beam routing and amplitude control modules based on a unique fault-tolerant scheme using a macro-pixel to control an optical beam are proposed. The unique macro-pixel method involving multiple device pixels per beam inherently provides a robust digital technique for module control while adding to the optical beam alignment tolerance and resistance to catastropic failure for the overall module. The macropixel approach solves the speed versus alignment and failure sensitivity dilemma present in single pixel element based optical micromechanical systems (MEMS). Specifically proposed are fault tolerant fiber-optic attenuators and switches using several microactuated micromirrors per optical beam. Transmissive and reflective module geometries are proposed using small tilt and small distance piston-action micromirrors, leading to fast module reconfiguration speed fiber optic signal controls. The macro-pixel design approach is extended to other pixel technologies such as polarization rotating pixels. The proposed fiber-optic attenuator and switch designs can be extended to realize a complex network of multiple attenuators and switches that can be applied to N-wavelength multiplexed fiber-optic networks.

20 Claims, 4 Drawing Sheets

OTHER PUBLICATIONS

Joseph E. Ford, James A. Walker, Vladimir Aksyuk and David J. Bishop, Wavelength–Selectable Add/Drop With Tilting Micromirrors, IEEE Leos Annual Meeting. Leos 1997.

L.Y. Lin, E.L. Goldstein, and R.W. Tkach, Free–Space Micromachined Optical Switches With Submillisecond Switching Time For Large–Scale Optical Crossconnects, IEEE Photonics Technology Letters, vol. 10, No. 4, Apr. 1998, pp. 525–527.

Joseph E. Ford and James A. Walker, Dynamic Spectral Power Equalization Using Micro–Opto–Mechanics, IEEE Photonics Technology Letters, vol. 10, No. 10, Oct. 1998, pp. 1440–1442.

Steffen Glockner, Rolf Goring, Torsten Possner, Micro–opto–mechanical beam deflectors, Optical Engineering, vol. 36, No. 5, May 1997, pp. 1339–1345.

Nabeel A. Riza and Sarun Sumriddetchkajorn, Digitally controlled fault–tolerant multiwavelength programmable fiber–optic attenuator using a two–dimensional digital micromirror device, Optics Letters, Vo. 24, No. 5, Mar. 1, 1999, pp. 282–284.

Nabeel A. Riza and Sarun Sumriddetchkajorn, Fault–tolerant polarization–insensitive photonic delay line architectures using two–dimensional digital micromirror devices, Optics Communications 160 (1999) pp. 311–320.

Nabeel A. Riza and Sarun Sumriddetchkajorn, Multiwavelength Three Dimensional 2×2 Fiber–Optic Switch Structure Using Small Tilt Micro–Mirrors, Part of the 18th Congress of the International Commission for Optics: Optics for the Next Millennium, San Francisco, California, Aug. 1999, SPIE, vol. 3749, pp. 470–471.

Sarun Sumriddetchkajorn and Nabeel A. Riza, Fault–Tolerant Multichannel Programmable Polarization Dependent Loss And Gain Compensator Structures Using Small Tilt Micromirrors, 1999 National Fiber Optic Engineers Conference, Chicago, Sep. 1999.

Nabeel A. Riza, Sarun Sumriddetchkajorn, Versatile multi–wavelength fiber–optic switch and attenuator structures using mirror manipulations, Optics Communications, 6060 (1999), pp. 1–11.

Nabeel A. Riza and Sarun Sumriddetchkajorn, Small Tilt Micromirror Device–based Multiwavelength Three Dimensional 2×2 Fiber–Optic Switch Structures, To be published in the SPIE Journal Optical Engineering, Late 1999/Early 2000.

Nabeel, A. Riza and Sarun Sumriddetchkajorn, Two Dimensional Digital Micromirror Device–based 2×2 Fiber–Optic Switch Array, IEEE Lasers and Electro–Optics Society, 1998 Annual Meeting, Dec. 1–4, 1998, vol. 2; 98CH36243, 1092–8081.

R.L. Knipe, Challenges of a Digital Micromirror Device: modeling and design, SPIE/EOS European Symposium on Lasers, Optics, and Vision for Productivity in Manufacturing, Besancon, France (Jun. 10–14, 1996).

Nabeel A. Riza, Coherent Techniques and Digital Micromirror Device based Switched Photonic Time Delay Control For High–Frequency Antenna Arrays, Proceedings of SPIE, Jul. 30–31, 1997, San Diego, California, vol. 3160.

Nabeel A. Riza and Sarun Sumriddetchkajorn, Fault–tolerant dense multiwavelength add–drop filter with a two–dimensional digital micromirror device, Applied Optics, Vo. 37, No. 27, Sep. 20, 1998, pp. 6355–6361.

* cited by examiner

FAULT-TOLERANT FIBER-OPTICAL BEAM CONTROL MODULES

Matter enclosed in heavy brackets [ ] appears in the original patent but forms no part of this reissue specification; matter printed in italics indicates the additions made by reissue.

FIELD OF INVENTION

In this invention, fiber-optic (FO) attenuator and switch modules using a macro-pixel approach to beam control are described. The preferred embodiment of this invention uses an array of high speed electronically controlled mechanically moving micromirrors to form the macropixel for single beam attenuation and routing. These high speed, robust, fault-tolerant FO structures can be used for routing and attenuating multiple light signals in optical networks such as wavelength division multiplexed (WDM) optical communications, distributed sensor networks, and photonic signal processing systems.

BACKGROUND OF INVENTION

The FO switch is a basic building block for many optical applications such as routing in fiber communications networks, photonic signal processing, distributed optical sensing, and optical controls. The desired features for a FO switch include low optical loss (e.g., <1 dB), low interchannel crosstalk (<−30 dB), polarization independence, robustness to catastrophic failure, and simple to align low cost designs for large scale commercial production and deployment. Depending on the application, FO switching speeds can range from nanoseconds to several milliseconds.

Similarly, variable fiber-optic attenuators are the basic building blocks for several key optical systems. Presently, these attenuators are required as equalizers in wavelength division multiplexed (WDM) optical communication systems using non-uniform gain optical amplifiers. Other important applications include polarization dependent loss compensation in fiber optic networks, optical component testing, and optical receiver protection. Hence, a variable fiber-optic attenuator with fast several microseconds duration speed with high attenuation dynamic range (e.g., 35 dB) control is a present challenge to the optical community.

Since centuries, an excellent choice for light control is via the use of mirrors. Mirrors provide high reflectivity over broad bandwidths, as desired in WDM systems. Today, an excellent method for making actively controlled mirrors is via microelectromechanical system (MEMS) technology that promises to offer low cost compact optical modules via the use of low cost batch fabrication techniques similar to semiconductor electronic chip production methods. MEMS technology has been previously proposed to realize fiber optic beam control modules.

For example, in M. F. Dautartas, A. M. Benzoni, Y. C. Chen, G. E. Blonder, B. H. Johnson, C. R. Paola, E. Rice, and Y.-H. Wong, "A silicon-based moving-mirror optical switch," Journal of Lightwave Technology, Vol. 10, No. 8, pp. 1078–1085, August 1992 and N. A. Riza and D. L. Polla, "Microdynamical fiber-optic switch," U.S. Pat. No. 5,208,880, May 4, 1993, FO switches are proposed using the electronically controlled actuation of a single micromirror fabricated using micromaching techniques used in MEMS chip fabrication. More recently, others have used this "single micromirror per optical beam" control approach to realize switches and attenuators. For instance, one such switching module is described in J. E. Ford, J. A. Walker, V. Aksyuk, and D. J. Bishop, "Wavelength selectable add/drop with tilting micromirrors," IEEE LEOS Annual Mtg., IEEE, NJ., postdeadline paperPD2.3, November, 1997, where apart from the limitations of using a single micromirror per beam, this 4-port switch is not reversible and does not form a 2×2 switch that can be used to form larger N×N switch matrices. Similarly, in S. Glöckner, R. Göring, and T. Possner, "Micro-opto-mechanical beam deflectors," Optical Engineering, Vol. 36, No. 5, pp. 1339–1345, May 1997, and L. Y. Lin, E. L. Goldstein, and R. W. Tkach, "Free-space micromachined optical switches with submillisecond switching time for large-scale optical crossconnects," IEEE Photonics Technology Letters, Vol. 10, No. 4, pp. 525–527, April 1998, a single micromirror per beam that can be rather large in size is used, leading to slow millisecond range switching speeds.

Single pixel per beam MEMS-based variable FO attenuators have also been proposed such as described in J. E. Ford and J. A. Walker, "Dynamic spectral power equalization using micro-opto-mechanics," IEEE Photonics Technology Letters, Vol. 10, No. 10, pp. 1440–1442, October, 1998, V. Askyuk, B. Barber, C. R. Giles, R. Ruel, L. Stulz, and D. Bishop, "Low insertion loss packaged and fibre connectorized MEMS reflective optical switch," IEE Electronics Lett., Vol. 34, No. 14, pp. 1413–1414, July 9, 1998, and B. Barber, C. R. Giles, V. Askyuk, R. Ruel, L. Stulz, and D. Bishop, "A fiber connectorized MEMS variable optical attenuator," IEEE Photon. Technol. Lett., Vol. 10, No. 9, pp. 1262–1264, September 1998. Apart from the tolerance limited single pixel control approach, attenuation control in these modules is implemented in an analog fashion by carefully moving a micromirror per beam (or wavelength) through a continuous range of positions. For instance, in both the cited V. Askyuk, et.al. designs, a micromirror is linearly translated to partially block a beam and hence cause attenuation. In the J. Ford, et.al. design case, a micromirror is translated through many small sub-micron size steps to form a varying reflection surface, and this ultra-small motion makes the module very sensitive to vibrations. Thus, extensive module calibration and costly and complex control electronics are required to maintain the high performance of these analog-type FO MEMS-based modules.

To understand the alignment tolerance versus speed dilemma further, for example, in the case of the previously suggested attenuator modules, typically there is one input and one output port. Here, light from a single mode fiber (SMF) for instance is focussed on to a single micromirror that is translated in an analog fashion to act as a variable optical shutter. Although the use of the tiny (a few microns size) optical mirror provides fast response in the microseconds domain, it is also highly susceptible to misalignments with the tightly focussed optical beam. In addition, if the single micromirror fails, the attenuator suffers catastrophic failure and the module completely fails. To improve the alignment problem, researchers have moved to larger micromirrors, although with a drastic reduction in speed to the millisecond regime. Another problem with these previously proposed MEMS-based attenuators is that they are analog devices that require precise analog voltage control, adding to the cost of the component. Hence a design dilemma exists between maximizing speed while maximizing alignment tolerance, simplicity of control, and reduction of component failure probability. The inventions in this patent application solve this dilemma for FO attenuators and switches, particularly using MEMS technology.

SUMMARY DESCRIPTION OF THE INVENTION

First, the macro-pixel FO beam control concept using digital device control method is described to solve the dilemma of speed versus tolerance, as first introduced by N. A. Riza in N. A. Riza and S. Sumriddetchkajorn, "Fault-tolerant dense multiwavelength add-drop filter with a two-dimensional digital micromirror device," Applied Optics, Vol. 37, No. 27, pp. 6355–6361, Sep. 20, 1998 and later in N. A. Riza and S. Sumriddetchkajorn, "Fault tolerant polarization-insensitive photonic delay line architectures using two dimensional digital micromirror devices," Optics Communications, Vol. 160, pp. 311–320, Feb. 15, 1999. Second, a compact FO attenuator structure using small tilt micromirror macropixels is proposed for both single wavelength and WDM applications as described in N. A. Riza and S. Sumriddetchkajorn, "Digitally controlled fault-tolerant multiwavelength programmable fiber-optic attenuator using a two dimensional digital micromirror device," Optics Letters, Vol. 24, No. 5, pp. 282–284, Mar. 1, 1999 and S. Sumriddetchkajorn and N. A. Riza, "Fault-tolerant multichannel programmable polarization dependent loss and gain compensator structures using small tilt micromirrors," National Fiber Optic Engineers Conference (NFOEC), Chicago, Ill., Sep. 26, 1999. Next, 2×2 and N×N optical switch structures are introduced using small tilt micromirror macropixels as cited in N. A. Riza and S. Sumriddetchkajorn, "Two dimensional digital micromirror device-based 2×2 fiber-optic switch array," IEEE LEOS Annual Meeting, Vol. 2, pp. 413–414, Orlando, Fla., December 1998, N. A. Riza and S. Sumriddetchkajorn, "Multiwavelength three dimensional 2×2 fiber-optic switch structure using small tilt micro-mirrors," Proceedings of Congress of the International Commission for Optics (ICO) XVIII, SPIE Vol. 3679, pp. 470–471, San Francisco, Calif., August 1999, and N. A. Riza and S. Sumriddetchkajorn, "Small tilt micromirror-based multiwavelength three-dimensional 2×2 fiber-optic switch structures," Optical Engineering, October, 1999. Small mirror motion can also be translational instead of tilts, and this is exploited to make both attenuators and switches in another embodiment of the micro-mirror based invention as also described in N. A. Riza and S. Sumriddetchkajorn, "Versatile multi-wavelength fiber-optic switch and attenuator structures using mirror manipulations," Optics Communications, October 1999. Finally, the macropixel concept is extended to other pixel technologies such as polarization rotators, e.g., liquid crystals, forming an attenuator as an example. The present invention forms reversible failure and alignment tolerant 2×2 switches with fast microseconds domain switching speeds.

DETAILED DESCRIPTION OF THE INVENTION

Figure 1:
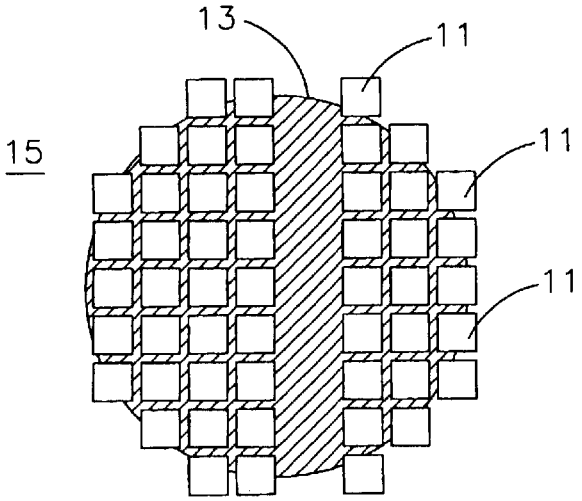
FIG. 1: shows a macropixel formed by a micromirror array of small-tilt type micromirrors that have two independent tilt states, forming a digital control attenuator that controls a single FO beam shown as a circular patch falling on the macro-pixel.

Our invention concept is based on using a "Macro-pixel" approach to light beam control (see FIG. 1) to solve the speed versus tolerance dilemma, thus realizing a commercially valuable component design. Instead of using a single high speed micromirror, we deploy several high speed micromirrors 11 simultaneously to control an optical beam 13 that is not tightly focussed. Light from an SMF (See FIG. 2) is collimated by a fiber collimator that expands the light beam on to a rather large (compared to a single micromirror) area, thus providing robustness in alignment. In one design, small tilt micromirrors 11 are used to form a macropixel 15. Each small tilt micromirror has two states, e.g., a 10° state and a −10° state for the Texas Instruments Device described in N. A. Riza, "Coherent Techniques and Digital Micromirror Device based Switched Photonic Time Delay Control for High-Frequency Antenna Arrays," SPIE Proc., Vol. 3160, pp. 97–103, July 1997, thus forming the desired digital operation device. The key advantages of using the macro-pixel approach are high optical alignment tolerance, fault tolerance to mechanical/electrical failures, inherent robust digital controls, and fast microseconds response speed of each individual micromirror as described in R. L. Knipe, "Challenges of a digital micromirror device™: modeling and design," SPIE Proc., Vol. 2783, pp. 135–145, June, 1996.

Figure 2A:
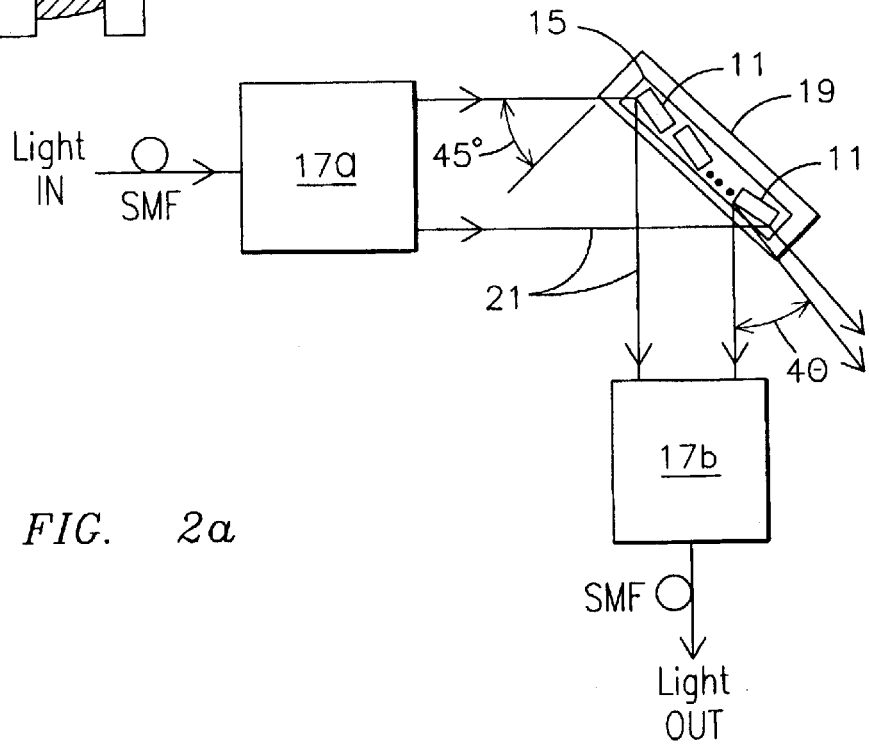
FIG. 2a shows a: Macropixel-based Digital Fiber-Optic Attenuator Structure in a single beam transmissive design attenuator.
Figure 2B:
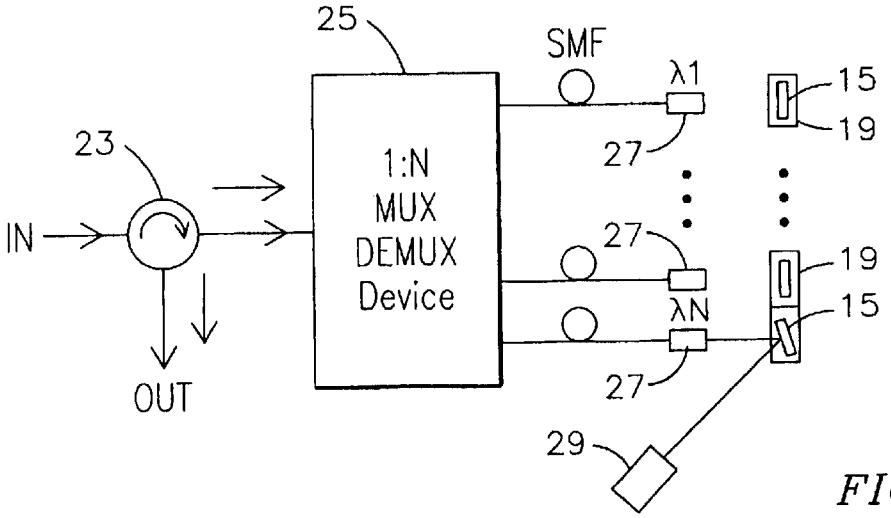
FIG. 2b shows a retro-reflective design N-wavelength attenuator.

Basic ray-optics can be used to explain the operation of the optical designs. FIGS. 2a and 2b show the small tilt micromirror-based variable fiber-optic attenuator structures. FIG. 2a illustrates the transmissive mode operation where two graded index (GRIN) fiber collimators 17a, 17b and a two-dimensional (2D) small tilt micromirror device 19 that forms a single macropixel 15 are used. Each micromirror 11 in the macropixel 15 can be set to tilt at an angle of +θ or −θ. When a micromirror 11 is programmed to tilt at +θ state, the portion of light beam coming from one GRIN lens 17a that is incident on this micromirror 11 is directed to the other GRIN lens 17b output port. On the other hand, when a micromirror 11 is set to −θ state, the corresponding part of the optical beam (lines 21) is reflected at an angle of 4θ to another direction, leading to the reduction of the optical power at the GRIN lens 17b output port. As an example, the two GRIN lenses 17a, 17b are positioned at 90 degrees with respect to each other. This angle can be greatly reduced for compact packaging. In fact, a single GRIN lens can be used with two input fibers where one fiber serves as the input fiber and the other serves as the output fiber receiving a slightly laterally displaced point of light after near retroreflection from the tilted macropixel. Hence, by simultaneous controlling the digital-mode tilt positions of each of the micromirrors 11 in the macropixel 15, a variable reflectivity larger mirror can be formed that leads to the desired FO beam power attenuation control. The basic transmissive-mode concept can be extended to multiple beams, as shown in FIG. 2b.

Specifically, this reflective mode optical attenuator structure is shown in FIG. 2b, where a three-port optical circulator 23 is combined with the small tilt micromirror devices 19 to form a multichannel variable optical attenuator. In this case, the multiwavelength optical beam at the IN port goes to the WDM multiplexor/demultiplexor device 25 by passing through the fiber-optic circulator 23. The output ports of the WDM device 25 are connected to GRIN lens fiber collimators 27 that are aligned so that the optical beams from these output ports fall on the corresponding small tilt micromirror devices 11. As shown, all the tilt-mirror devices 11 are populated on one bigger chip. An alternate design applicable to all proposed FO module designs in this application is to have a smaller independent macro-pixel chip per fiber to ease in alignment and repair of the FO module. This way, when a chip fails, it is replaced for that specific fiber and not all the fibers. In both single large chip and many small MEMS chip cases, when the macropixels 15 are programmed to the +θ state, the optical beams hitting these macro-pixels are reflected back to their own ports 27, multiplexed by the WDM device 25, and sent to the OUT port by passing through the optical circulator 23. On the other hand, when the macropixels 15 are set to the −θ state, the optical beams are reflected off at an angle of 40 with respect to the optical path of the +θ state setting to an absorber or monitoring port 29. By selectively turning on or off the individual micromirrors 11 in the macropixel, light emerging from the SMF can be redirected back into the SMF with variable power control. This concept forms the basis for the proposed retroreflective design attenuator.

Figure 3A:
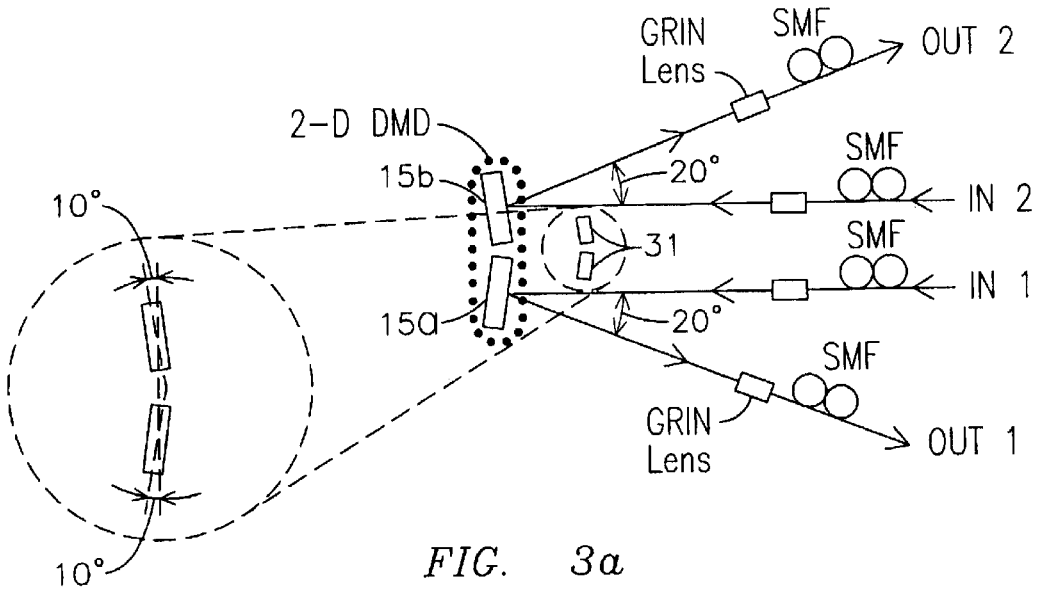
FIG. 3a shows a: Small Tilt Micromirror-based 2×2 Fiber-Optic Switch Structures for a single beam transmissive design switch.
Figure 3B:
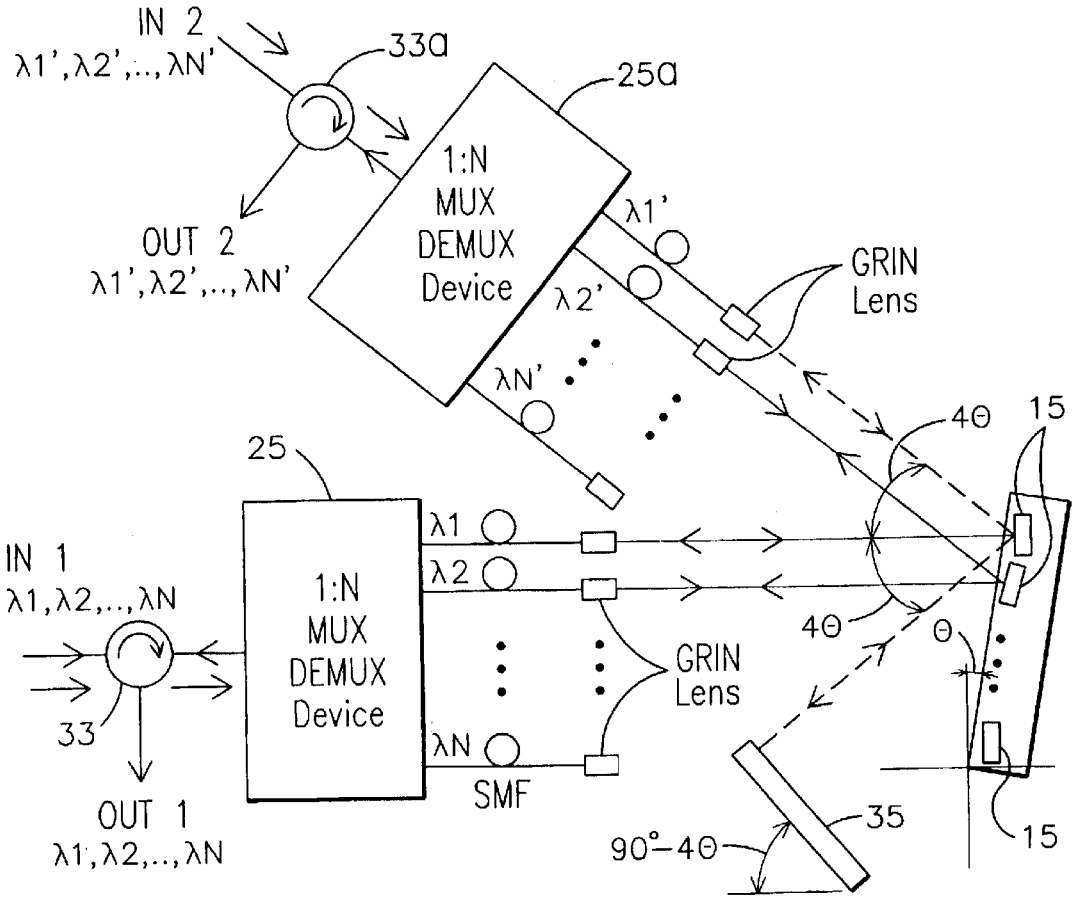
FIG. 3b shows a retro-reflective design N-wavelength switch, including an active add/drop WDM filter architecture based on the switched retroreflection 2×2 optical switch.
Figure 3C:
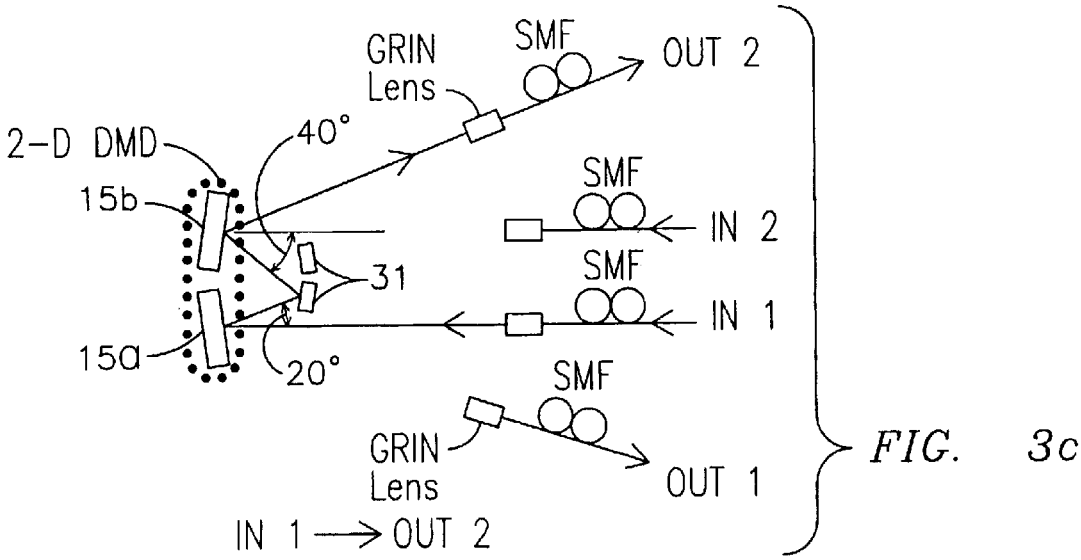
FIGS. 3c and 3d illustrates operation of the switch of FIG. 3a for reflecting light from one input port to an opposite output port.
Figure 3D:
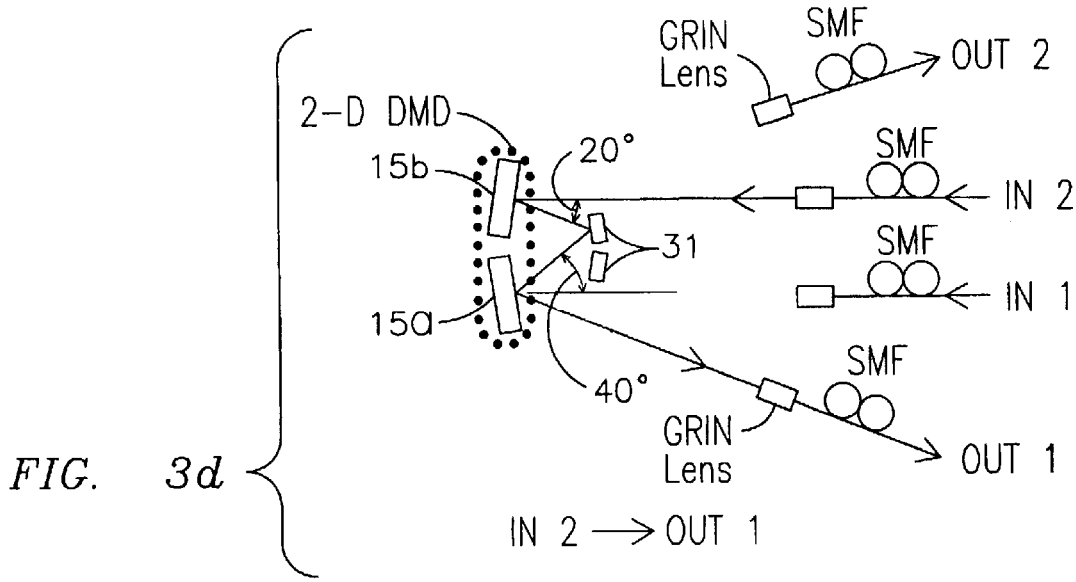

FIGS. 3a and 3b show the small tilt micromirror-based fiber-optic switch structures. The transmissive design is illustrated in FIG. 3a. In this case, when macropixel 15a is set to the for example −10° state and macropixel 15b is set to the for example +10°, the optical beams from IN1 and IN2 travel to OUT1 and OUT2, respectively. On the other hand, when macropixel 15a is set to the +10° state and macropixel 15b is set to the −10° state, using the fixed dual-mirror set-up 31, the optical beam from IN1 travels to OUT2 while the optical beam from IN2 goes to OUT1. Thus, a 2×2 FO switch with simple digital control is formed using the small tilt micromirror macropixel approach. This concept can be extended to multiple FO beams, such as the N-wavelength scenario in WDM systems. FIGS. 3c and 3d show light beam paths for the switched system.

This extended multiple FO beam 2×2 switch module is shown in FIG. 3b and indicates a reflective mode architecture. In this case, when the macropixel is set to for example +10° (e.g., θ=10°), the input optical beam from IN1 is reflected back to OUT1 after passing through the optical circulator 33. At the same time, the input optical beam from IN2 incident on the macropixel 15 at a 40° angle is reflected back to OUT2 by using the fixed mirror 35. On the other hand, when the macropixel 15 is set to for example −10°, the input optical beams from IN1 and IN2 reflects at the macropixel to OUT2 and OUT1, respectively. Thus, a multiple FO beam 2×2 switch module is formed. A key innovation here is the placement of the fixed mirror 35 that allows for large beam deflections even though small tilt mirror devices 19 are used.

Figure 4:
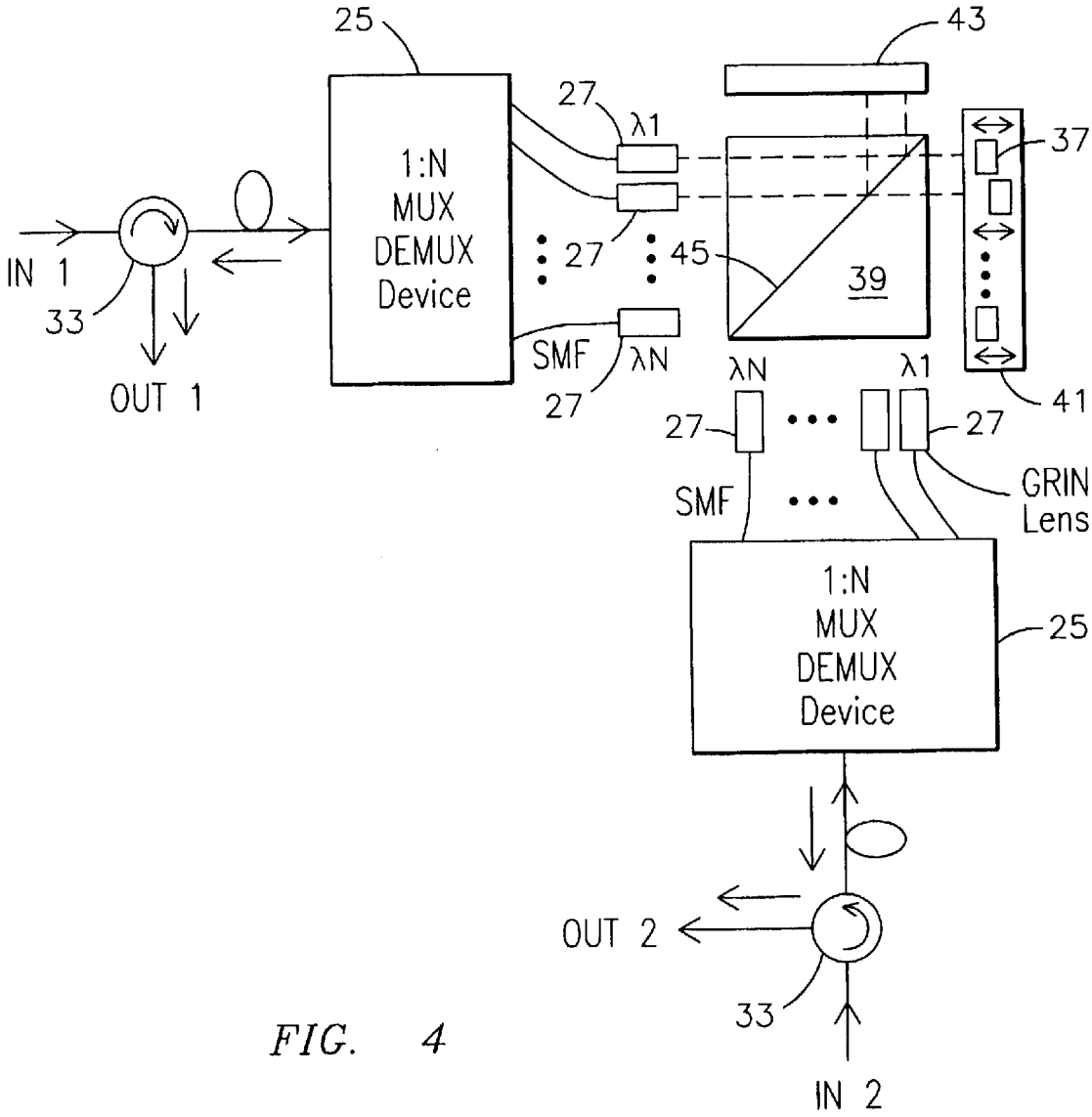
FIG. 4 illustrates a Piston Type Micromirror-based Fiber-Optic 2×2 Switch Structure for N-wavelength/beams routing.

Although small tilt-mirror devices 19 are highly effective optical MEMS devices from a speed and performance point of view, the macropixel 15 can be formed by another type of optical MEMS device such as the piston-type micromirror devices 37. In this case, the micromirror 37 moves like a piston, and can have a very fast response, e.g., sub-microseconds, if the motion distance is small, e.g., less than half a micron. This type of optical MEMS device property is exploited in the FIG. 4 FO module design that shows a FO switch/attenuator structure using a Michelson interferometer arrangement coupled with a piston-type micromirror device. In this case, a multi-wavelength optical beam design is shown where beams from IN1 and IN2 are being demultiplexed by the WDM devices 25 after passing through the three-port optical circulators 33. The output ports of the WDM devices 25 are connected to GRIN lenses 27 arranged in 2D space. Each GRIN fed optical beam is equally split into two optical beams by a cube beam splitter (BS) 39. One optical beam travels straight through and hits a macro-pixel in the 2D piston-type analog operation-based micromirror device 41. The other optical beam is 90° reflected by the BS 39 towards the fixed mirror 43. After reflection from the mirror 43, the two optical beams interfere at the cube BS diagonal interface 45, later to be multiplexed and pass through the switch output ports via the three-port optical circulators 33. When the optical path difference between the two optical beams is equal to a multiple of λ, where λ is the optical beam wavelength, the desired wavelength optical beams from IN1 and IN2 are sent to OUT2 and OUT1, respectively. On the other hand, when the optical path difference between the split optical beams is λ/2, the desired wavelength optical beams from IN1 and IN2 is sent to OUT1 and OUT2, respectively. Thus, a multi-beam FO 2×2 switch is formed using the interference principle with the macropixel control concept.

As pointed out earlier, each mirror 43 in the 2D piston-type micromirror device 41 can be operated in an analog manner, indicating that the optical path difference can be varied from 0 to λ/2. As a result, the output intensity can be controlled in an analog fashion, leading to variable optical beam power at both output ports of the interferometric structure. To realize the multi-wavelength variable optical attenuator, one output port of this switch structure can be used as the monitoring port and the other one is used as the main output port. Thus, a fault-tolerant high speed variable FO attenuator is formed.

Figure 5:
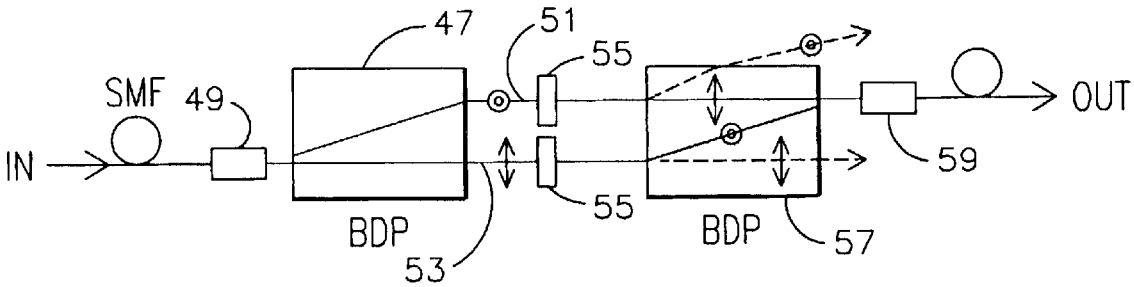
FIG. 5 illustrates an alternative embodiment of the macro-pixel approach to non-MEMS technologies such as polarization rotating devices such as liquid crystals. Shown is a single beam FO fault-tolerant high speed attenuator using beam displacing polarizers.

FIG. 5 shows the macro-pixel extension of non-MEMS technologies to form a variable fiber-optic attenuator. In this case, a beam displacing prism (BDP) 47 splits the optical beam emerging from the input GRIN fiber collimator 49 into two linearly orthogonal polarization lights 51, 53. Each optical beam goes through a macro-pixel device 55 such as multipixel liquid crystal device (LCs). When a pixel 55 is considered on, input light polarization is rotated by 90 degrees. When a pixel 55 is considered off, input light polarization is not rotated by 90 degrees. Thus, depending on the on/off pixel setting in the two macropixels 55 made from an LC material such as a ferroelectric or nematic LC, the desired amount of the optical power of each polarized optical beam, after passing through another BDP 57, can couple to an output GRIN fiber collimator 59, resulting in optical beam power control at the output port. The dashed lines indicate where the rejected power goes that can be used for a monitoring port. Similarly, LC macropixels can be used to form fault-tolerant switch structures.

What is claimed is:

1. An optical micromechanical system for controlling reflectivity of a *single* light beam from an optical source, the *optical micromechanical* system including a macropixel comprising a plurality of individual micromirrors which are closely spaced with respect to the wavelength of the light beam *and arranged such that the light beam impinges substantially concurrently on the plurality of micromirrors*, each of the micromirrors being electronically controllable to effect a mechanical movement, the macropixel being operable in a first mode for concurrently maintaining an alignment of the micromirrors at a common displacement for maximizing reflection of the *single* light beam in a selected path, *and* the macropixel being operable in a second mode for aligning some of the micromirrors [in] *into* a different displacement *for deflecting portions of the light beam impinging on the aligned micromirrors out of the selected path* so as to effectively attenuate the reflected light beam.

2. The optical [mechanical] *micromechanical* system of claim 1, wherein the displacement of the micromirrors comprises an angular tilt of each micromirror.

3. The optical [mechanical] *micromechanical* system of claim 1, wherein the displacement of the micromirrors comprises a displacement in the direction of the light beam.

4. [The] *An* optical mechanical system [of claim 3] *for controlling reflectivity of a light beam from an optical source, the optical mechanical system including*

*a macropixel comprising*

*a plurality of individual micromirrors which are closely spaced with respect to the wavelength of the light beam, each of the micromirrors being electrically controllable to effect a mechanical movement,*

*the macropixel being operable in a first mode for concurrently maintaining an alignment of the micromirrors at a common displacement for maximizing reflection of the light beam in a selected path,*

*the macropixel being operable in a second mode for aligning some of the micromirrors in a different displacement so as to effectively attenuate the reflected light beam, the displacement of the micromirrors comprising a displacement in the direction of the light beam,*

[wherein the system includes] a plurality of macropixels aligned in a 2-dimensional array, a cube beam splitter positioned in a light beam path with one face thereof adjacent said array, a fixed mirror positioned adjacent a second face of said beam splitter, a first plurality of input light lenses positioned for bi-direction transfer of light beams to said beam splitter at a third face of said beam splitter and a second plurality of output light lenses positioned for bi-directional transfer of light to said beam splitter at a fourth face thereof, the beam splitter being effective to split a light beam impinging thereon into two equal beam components, one of said beam components traveling through said beam splitter to said macropixel array and the other of said beam components being directed onto said fixed mirror, each of said beam components being reflected back into said beam splitter to create an interference along a diagonal of said beam splitter such that when an optical path difference between the two beam components is equal to a multiple of the optical beam wavelength, the beam from one of the input and output lenses is transferred to the other of the input and output buses, and, when the optical path difference is equal to one-half of an optical beam wavelength, the beam is directed back to its source lens, the optical beam path length through the beam splitter being adjustable by linear movement of each macropixel.

5. The optical mechanical system of claim 4 and [includes] *including* an optical circulator in an optical path with each of said input and output lenses for directing light beams directed from said beam splitter to [respect] *respective* ones of said lenses to a selected output port.

[6. The optical mechanical system of claim 2 and including a light beam source aligned for directing a beam of light onto said macropixel and a light beam receiver aligned for receiving light reflected from said macropixel, said micromirrors being angularly adjustable for instantaneously controlling the intensity of light reflected onto said receiver.]

7. The optical [mechanical] *micromechanical* system of claim [6] *1* wherein said light beam source includes the serial combination of a fiber optical cable and a [GRIN] *fiber coupling* lens.

8. The optical [mechanical] *micromechanical* system of claim 7 wherein said light beam receiver includes a [GRIN] *fiber coupling* lens on which said light beam is reflected.

9. [The optical mechanical system of claim 2] *An optical micromechanical system for controlling reflectivity of a light beam from an optical source, the system including*

*a macropixel comprising*

*a plurality of individual micromirrors which are closely spaced with respect to the wavelength of the light beam, each of the micromirrors being electrically controllable to effect a mechanical movement,*

*the macropixel being operable in a first mode for concurrently maintaining an alignment of the micromirrors at a common displacement for maximizing reflection of the light beam in a selected path,*

*the macropixel being operable in a second mode for aligning some of the micromirrors in a different displacement so as to effectively attenuate the reflected light beam, the displacement of the micromirrors comprising an angular tilt of each micromirror, and*

[including] a bi-directional light transfer device positioned for transmitting a light beam onto said macropixel and for receiving a light beam reflected from said macropixel, said micromirrors being individually angularly controllable to adjust the intensity of light reflected back to said transfer device.

10. The optical [mechanical] *micromechanical* system of claim 9 [and including], *further comprising* a multiplexor/demultiplexor for providing a plurality of light beams and a corresponding plurality of macropixels, each of said beams being directed onto a respective one of said macropixels, each of said macropixels being controllable to attenuate reflected light intensity.

11. A 2×2 optical switch [incorporating the optical mechanical system of claim 2], *including*

*a plurality of macropixels, each macropixel comprising*

*a plurality of individual micromirrors which are closely spaced with respect to the wavelength of the light beam, each of the micromirrors being electronically controllable to effect a mechanical movement,*

*each macropixel being operable in a first mode for concurrently maintaining an alignment of the micromirrors at a common displacement for maximizing reflection of the light beam in a selected path,*

*each macropixel being operable in a second mode for aligning some of the micromirrors in a different displacement so as to effectively attenuate the reflected light beam, wherein the displacement of the micromirrors comprises an angular tilt of each micromirror;*

[the switch including] first and second input ports,

[and] first and second output ports, a first macropixel having a first orientation for reflecting light from said first input port to said first output port, a second macropixel having a first orientation for reflecting light from said second input port to said second output port, *and* first and second fixed mirrors positioned adjacent and facing toward a respective one of said macropixels, each of said macropixels being [contorllable] *controllable* by angularly tilting the micromirrors thereof for reflecting light onto respective ones of said fixed mirrors, said fixed mirrors reflecting light from each macropixel to the other of the macropixels whereby light from the first and second input ports is reflected to the second and first output ports, respectively.

12. A multi-wavelength 2×2 optical switch [incorporating the optical mechanical system of claim 2], including

*a plurality of macropixels comprising a plurality of individual micromirrors which are closely spaced with respect to the wavelength of the light beam, each of the micromirrors being electronically controllable to effect a mechanical movement,*

*each macropixel being operable in a first mode for concurrently maintaining an alignment of the micromirrors at a common displacement for maximizing reflection of the light beam in a selected path,*

*each macropixel being operable in a second mode for aligning some of the micromirrors in a different displacement so as to effectively attenuate the reflected light beam, wherein the displacement of the micromirrors comprises an angular tilt of each micromirror;* the [switch having a] plurality of macropixels arranged in a linear array, a first optical multiplexor/demultiplexor device for directing respective light beam wavelengths onto corresponding ones of the macropixels and for receiving reflected light therefrom, a second optical multiplexor/demultiplexor device for directing respective light beam wavelengths onto corresponding ones of the macropixels and for receiving reflected light therefrom, *and* a fixed mirror, said macropixels being separately controllable so as to be aligned in a first orientation for reflecting light from said first optical *multiplexor/demultiplexor* device back to said first optical *multiplexor/demultiplexor* device and for reflecting light from said second *multiplexor/demultiplexor* optical device onto said fixed mirror, back to said macropixels and to said second *multiplexor/demultiplexor* optical device, said macropixels being alignable in another orientation for reflecting light from one of said first and second optical *multiplexor/demultiplexor* devices to the other of said first and second optical *multiplexor/demultiplexor* devices.

*13. An optical mechanical system for controlling reflectivity of a light beam from an optical source, the system including*

*a plurality of macropixels, each macropixel comprising*

*a plurality of individual micromirrors which are closely spaced with respect to the wavelength of the light beam, each of the micromirrors being electronically controllable to effect a mechanical movement,*

*the macropixel being operable in a first mode for concurrently maintaining an alignment of the micromirrors at a common displacement for maximizing reflection of the light beam in a selected path,*

*the macropixel being operable in a second mode for aligning some of the micromirrors in a different displacement so as to effectively attenuate the reflected light beam; wherein the displacement of the micromirrors comprises an angular tilt of each micromirror;*

*wherein the plurality of macropixels are aligned in a 2-dimensional array,*

*a cube beam splitter positioned in a light beam path with one face thereof adjacent said array,*

*a fixed mirror positioned adjacent a second face of said beam splitter,*

*a first plurality of input light lenses positioned for bi-directional transfer of light beams to said beam splitter at a third face of said beam splitter and*

*a second plurality of output light lenses positioned for bi-directional transfer of light to said beam splitter at a fourth face thereof,*

*the beam splitter being effective to split a light beam impinging thereon into two equal beam components, one of said beam components traveling through said beam splitter to said macropixel array and the other of said beam components being directed onto said fixed mirror, each of said beam components being reflected back into said beam splitter to create an interference along a diagonal of said beam splitter such that when an optical path difference between the two beam components is equal to a multiple of the optical beam wavelength, the beam from one of the input and output lenses is transferred to the other of the input and output buses, and, when the optical path difference is equal to one-half of an optical beam wavelength, the beam is directed back to its source lens, the optical beam path length through the beam splitter being adjustable by linear movement of each macropixel.*

*14. The optical mechanical system of claim 13 and including an optical circulator in an optical path with each of said input and output lenses for directing light beams directed from said beam splitter to respective ones of said lenses to a selected output port.*

*15. An optical micromechanical system for controlling reflectivity of a light beam from an optical source, the system including*

*a plurality of macropixels, each macropixel comprising*

*a plurality of individual micromirrors which are closely spaced with respect to the wavelength of the light beam, each of the micromirrors being electronically controllable to effect a mechanical movement,*

*the macropixel being operable in a first mode for concurrently maintaining an alignment of the micromirrors at a common displacement for maximizing reflection of the light beam in a selected path,*

*the macropixel being operable in a second mode for aligning some of the micromirrors in a different displacement so as to effectively attenuate the reflected light beam; and*

*a multiplexor/demultiplexor for providing a plurality of light beams, each of the plurality of beams being directed onto a respective one of the plurality of macropixels, and each of the plurality of macropixels being controllable to attenuate reflected light intensity.*

*16. A 2×2 optical switch, the switch including*

*a first macropixel and a second macropixel, each macropixel comprising a plurality of individual micromirrors which are closely spaced with respect to the wavelength of the light beam,*

*each of the micromirrors being electronically controllable to effect a mechanical movement,*

*the macropixel being operable in a first mode for concurrently maintaining an alignment of the micromirrors at a common displacement for maximizing reflection of the light beam in a selected path,*

*the macropixel being operable in a second mode for aligning some of the micromirrors in a different displacement so as to effectively attenuate the reflected light beam;*

*first and second input ports,*

*first and second output ports, wherein the first macropixel has a first orientation for reflecting light from said first input port to said first output port, and wherein the second macropixel has a first orientation for reflecting light from said second input port to said second output port, and*

*first and second fixed mirrors positioned adjacent and facing toward a respective one of said macropixels, each of said macropixels being controllable by angularly tilting the micromirrors thereof for reflecting light onto respective ones of said fixed mirrors, said fixed mirrors reflecting light from each macropixel to the other of the macropixels whereby light from the first and second input ports is reflected to the second and first output ports, respectively.*

*17. A multi-wavelength 2×2 optical switch, the switch including*

*a plurality of macropixels comprising a plurality of individual micromirrors which are closely spaced with respect to the wavelength of the light beam,*

*each of the micromirrors being electronically controllable to effect a mechanical movement,*

*each macropixel being operable in a first mode for concurrently maintaining an alignment of the micromirrors at a common displacement for maximizing reflection of the light beam in a selected path,*

*each macropixel being operable in a second mode for aligning some of the micromirrors in a different displacement so as to effectively attenuate the reflected light beam;*

*wherein the plurality of macropixels are arranged in a linear array,*

*a first optical multiplexor/demultiplexer device for directing respective light beam wavelengths onto corresponding ones of the macropixels and for receiving reflected light therefrom, and*

*a second optical multiplexor/demultiplexor device for directing respective light beam wavelengths onto corresponding ones of the macropixels and for receiving reflected light therefrom, a fixed mirror,*

*said plurality of macropixels being separately controllable so as to be aligned in a first orientation for reflecting light from said first optical device back to said first optical device and for reflecting light from said second optical device onto said fixed mirror, back to said plurality of macropixels and to said second optical device, said plurality of macropixels being alignable in another orientation for reflecting light from one of said first and second optical devices to the other of said first and second optical devices.*

*18. The optical micromechanical system of claim 2, further comprising a multiplexor/demultiplexor for providing a plurality of light beams and a corresponding plurality of macropixels, each of said beams being directed onto a respective one of said macropixels, each of said macropixels being controllable to attenuate reflected light intensity.*

*19. The optical micromechanical system of claim 18, further comprising an optical circulator in an optical path between the optical source and said wavelength multiplexor/demultiplexor for directing a light beam directed from said wavelength multiplexor/demultiplexor to a selected output port.*

*20. The optical micromechanical system of claim 3, further comprising a multiplexor/demultiplexor for providing a plurality of light beams and a corresponding plurality of macropixels, each of said beams being directed onto a respective one of said macropixels, each of said macropixels being controllable to attenuate reflected light intensity.*

*21. The optical micromechanical system of claim 20, further comprising an optical circulator in an optical path between the optical source and said wavelength multiplexor/demultiplexor for directing a light beam directed from said wavelength multiplexor/demultiplexor to a selected output port.*

* * * * *

UNITED STATES PATENT AND TRADEMARK OFFICE

CERTIFICATE OF CORRECTION

PATENT NO. : RE42,124 E
APPLICATION NO. : 10/422341
DATED : February 8, 2011
INVENTOR(S) : Riza It is certified that error appears in the above-identified patent and that said Letters Patent is hereby corrected as shown below:

Title page, item (56), under "Other Publications", in Column 1, Line 4, delete "p." and insert -- pp. --.

Title page, item (57), under "Abstract", in Column 2, Line 2, delete "macro-pixel" and insert -- macropixel --.

Title page, item (57), under "Abstract", in Column 2, Lines 3-4, delete "macro-pixel" and insert -- macropixel --.

Title page, item (57), under "Abstract", in Column 2, Line 7, delete "catastropic" and insert -- catastrophic --.

Title page, item (57), under "Abstract", in Column 2, Line 16, delete "macro-pixel" and insert -- macropixel --.

Page 2, item (56), under "Other Publications", in Column 1, Line 3, delete "Meeting." and insert -- Meeting, --.

Column 8, line 40, in Claim 10, delete "claim 9 [and including], further comprising" and insert -- claim 9*, further comprising* [and including] --.

Column 8, line 47, in Claim 11, delete "2×2" and insert -- [2.times.2] *2×2* --.

Column 9, line 13, in Claim 12, delete "2×2" and insert -- [2.times.2] *2×2* --.

Column 10, line 14, in Claim 13, delete "splitter" and insert -- *splitter*, --.

Signed and Sealed this
Twenty-first Day of June, 2011

David J. Kappos
*Director of the United States Patent and Trademark Office*